United States Patent

[11] 3,627,187

| [72] | Inventor | Heinz Hartkopf |
| | | Solingen, Germany |
| [21] | Appl. No. | 6,345 |
| [22] | Filed | Jan. 28, 1970 |
| [45] | Patented | Dec. 14, 1971 |
| [73] | Assignee | Th. Kieserling & Albrecht |
| | | Solingen, Germany |
| [32] | Priority | Feb. 1, 1969 |
| [33] | | Germany |
| [31] | | P 19 05 066.9 |

[54] TRANSPORTING APPARATUS FOR PIPES OR THE LIKE
10 Claims, 8 Drawing Figs.

[52] U.S. Cl. .................................................. 226/108,
226/176, 226/181
[51] Int. Cl. ..................................................... B65h 17/20
[50] Field of Search ............................................ 276/176,
177, 181, 108; 279/22, 75; 269/266, 267

[56] References Cited
UNITED STATES PATENTS

| 2,187,405 | 1/1940 | Smethers ...................... | 279/22 X |
| 3,490,665 | 1/1970 | Jonsson ........................ | 226/177 X |
| 3,527,126 | 9/1970 | Jones ............................. | 226/176 X |

Primary Examiner—Richard A. Schacher
Attorney—Michael S. Striker

ABSTRACT: Transporting apparatus for tubes, bars or like workpieces wherein the housings for driven work-engaging rolls are pivotally mounted on a support which is turnable about the axis of a conveyed workpiece to thereby move the rolls radially and sideways and to enlarge or reduce the area of the passage for workpieces. The housings are coupled to links which hold them against changes in angular position during rotation of the support. The latter is rotatable by a double-acting cylinder and respectively reduces or increases the area of the passage between the peripheral surfaces of the rolls when it is caused to rotate in a clockwise or in a counterclockwise direction.

3,627,187

INVENTOR:

HEINZ HARTKOPF

INVENTOR:

HEINZ HARTKOPF

3,627,187

TRANSPORTING APPARATUS FOR PIPES OR THE LIKE

BACKGROUND OF THE INVENTION

The present invention relates to transporting apparatus for pipes, rods or analogous elongated workpieces. More particularly, the invention relates to improvements in apparatus which can be utilized to feed elongated tubular or bar stock of circular or polygonal cross-sectional outline into the revolving head of a straightening, shaving or like machine. Still more particularly, the invention relates to improvements in apparatus which can effect lengthwise movement and can simultaneously prevent rotation of elongated workpieces about their own axes.

Many presently known straightening or shaving machines for tubular or bar stock are capable of treating workpieces of greater or smaller diameter or cross section. However, the apparatus which feed workpieces to or withdraw workpieces from such machines cannot be rapidly adjusted to transport pipes or rods of greater or smaller cross-sectional area. As a rule, such feeding and removing apparatus comprise sets of driven rolls which must be moved toward or away from each other to define a passage which is just large enough for axial transport of workpieces. Adjustments in the positions of rolls consume much time and necessitate lengthy interruptions in operation of associated machines. The rolls normally serve the additional purpose of preventing rotation of conveyed workpieces, i.e., they must engage the external surfaces of workpieces with a force which suffices to oppose the forces generated by the straightening elements or knives in the revolving head of a straightening or shaving machine. Therefore, conventional feeding apparatus normally comprise a large number of rolls and one such apparatus is normally provided at each end of a straightening or shaving machine. Consequently, the conversion of such apparatus for transport of larger- or smaller-diameter pipes or rods is a time-consuming procedure and must be carried out by skilled persons. The rolls must be adjusted individually or in pairs. Another drawback of such apparatus is that the rolls cannot be adjusted within a wide range so that the apparatus must be furnished with sets of spare rolls in order to enable the apparatus to transport workpieces whose diameters vary within a wide range.

SUMMARY OF THE INVENTION

An object of the invention is to provide a transporting apparatus for tubes, rods or like elongated workpieces of circular or polygonal cross-sectional outline and to construct and assemble the apparatus in such a way that a single adjustment suffices to change the positions of all work-engaging elements when the apparatus is to be converted for transport of different types of workpieces.

Another object of the invention is to provide an apparatus which can be used interchangeably for transport of workpieces of circular or polygonal outline without necessitating any changes in the mounting of its work-engaging elements.

A further object of the invention is to provide an apparatus which can prevent uncontrolled rotation of conveyed workpieces and which can hold such workpieces against rotation about their axes with a force which suffices to properly feed workpieces through a straightening, shaving or like machine.

An additional object of the invention is to provide an apparatus which can be converted for transport of differently dimensioned and/or configurated elongated workpieces with little loss in time, with a high degree of accuracy, and by resorting to simple and compact adjusting means.

The transporting apparatus of my invention comprises a support which is rotatable about a predetermined axis, work-advancing means including a plurality (preferably four) work-advancing units each comprising a first portion, pivot means connecting the first portion to the support, and a work-engaging driven second portion mounted in the first portion, the second portions defining a passage through which a workpiece is conveyed lengthwise so that its axis coincides with the axis of the support, and levelling means coupled with the first portions to hold the work advancing units against changes in orientation during rotation of the support so that such rotation effects simultaneous radial and sidewise movement of second portions to respectively enlarge and reduce the area of the passage in response to rotation of the support in first and second directions.

The apparatus further comprises means for rotating the support in clockwise and counterclockwise directions. Thus, by the simple expedient of changing the angular position of the support, the apparatus can simultaneously adjust the positions of all work-engaging portions to define a passage which is best suited for lengthwise transport of a given workpiece.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
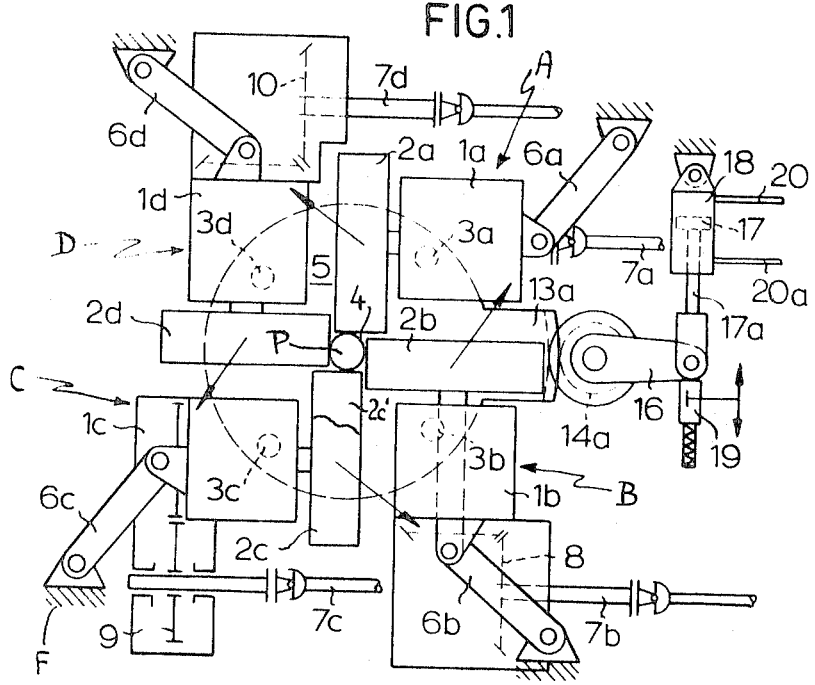
FIG. 1 is a schematic side elevational view of a transporting apparatus which embodies the invention.
Figure 2:
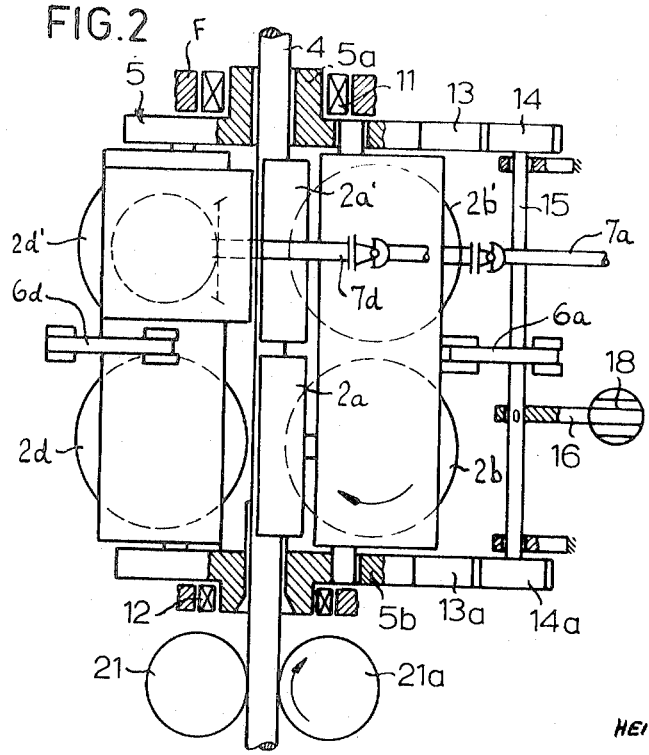
FIG. 2 is a partial plan and partial horizontal sectional view of the transporting apparatus.

Referring to FIGS. 1 and 2, the apparatus therein shown is designed to transport tubular or bar stock of varying cross-sectional area. It comprises a frame F which accommodated bearings 11, 12 for a two-piece support 5 including sections 5a, 5b rotatable about a horizontal axis which coincides with the axis of the conveyed workpiece 4, e.g., a length of pipe or a bar of circular cross-sectional outline. The space between the sections 5a, 5b of the support 5 accommodates four work advancing units A, B, C, D which respectively comprise first portions or housings 1a, 1b, 1c, 1d and second portions including driven work engaging rolls 2a, 2b, 2c, 2d. The housings 1a-1d are provided with pairs of coaxial pivots or trunnions 3a, 3b, 3c, 3d which are mounted in the sections 5a, 5b and are equidistant from each other as well as from the axis of the support 15.

The apparatus further comprises levelling means for preventing changes in orientation of the housings 1a-1d when the support 5 is rotated in a clockwise or in a counter clockwise direction to thereby change the cross-sectional area of a passage P defined by the rolls 2a-2d. The axes of these rolls are located in a common plane which is normal to the axis of the support 5. The levelling means comprises four links 6a, 6b, 6c, 6d each of which is pivotally mounted in the frame F at its outer end and is articulately connected to the respective housing 1a, 1b, 1c, 1d at the inner end. The arrangement is such that the links 6a–6d hold the units A–D against tilting when the support 5 rotates about its axis whereby the rolls 2a–2d move radially of the axis of the support 5 (either toward or away from such axis, depending on the direction of rotation of the support) as well as sideways (compare FIGS. 3, 4, 5 or 6, 7, 8).

The shafts of the rolls 2a–2d are rotatable in the respective housings 1a–1d and are driven by transmissions which are accommodated in such housings. The transmissions for the rolls 2b, 2d comprise pairs of bevel gears 8, 10 and the transmissions for the rolls 2a, 2c comprise mating spur gears 9. The input members of the transmissions in housings 1a–1d are respectively driven by Cardanic shafts 7a, 7b, 7c, 7d. All of the rolls 2a–2d are driven at the same speed and their peripheral surfaces engage the workpiece 4 with a force which suffices to hold the workpiece against rotation about its axis while moving lengthwise through the revolving head of a straightening or shaving machine (not shown).

As shown in FIGS. 1 and 2, the axes of shafts of the rolls 2a–2d are normal to and cross in space the axis of the support 5 as well as the axes of the respective pivots 3a–3d. These pivots are parallel to the axis of the support 5.

The means for rotating the support 5 about its axis comprises a pair of aligned gear segments 13, 13a on the sections 5a, 5b, a pair of coaxial gears 14, 14a which are mounted on a shaft 15 and respectively mesh with the segments 13, 13a, an arm 16 which is rigid with and extends radially from an intermediate portion of the shaft 15, and a double-acting hydraulic or pneumatic motor including a cylinder 18 pivotally attached to the frame F, a piston 17 in the cylinder 18, and a piston rod 17a which is coupled to the arm 16. Conduits 20, 20a serve to admit or evacuate fluid from the chambers of the cylinder 18. A stop 19 which is adjustable in directions indicated by a double-headed arrow serves to determine the maximum extent of rotation of the support 5 in a counterclockwise direction, as viewed in FIG. 1.

In the illustrated embodiment, the housings 1a, 1c, 1d are relatively long so that they can accommodate a second set of driven rolls 2a', 2b', 2c', 2d' which are mounted and driven in the same way as the rolls 2a–2d. The purpose of additional rolls 2a'–2d' is to further reduce the likelihood of rotation of a transported tubular workpiece about its axis. It is clear that each of the housings 1a–1d can support a single driven roll or three or more driven rolls. The axis of the rolls 2a'–2d' are located in a common plane which is parallel to the plane in which the axis of the rolls 2a–2d arc located. The numerals 21, 21a denote two auxiliary advancing rolls which feed workpieces 4 into the passage 5. The motors which drive the shafts 7a–7d for the transmissions in the housings 1a–1d are not shown in the drawing. The peripheries of rolls 2a–2d and/or 2a'–2d' are preferably provided with coats of friction generating material to further reduce the likelihood of slippage.

Figure 3:
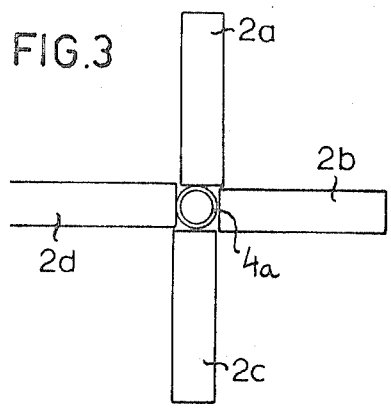
FIG. 3 is a side elevational view of four work-engaging rolls in the apparatus of FIG. 1, showing the rolls in positions they assume during transport of a large-diameter workpiece.
Figure 4:
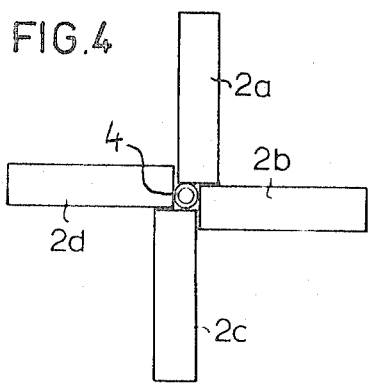
FIG. 4 is a similar side elevational view but showing the rolls during transport of a smaller-diameter workpiece.

The positions of rolls 2a–2d with reference to the axis of the support 5 shown in FIG. 1 correspond substantially to the positions shown in FIG. 4. If the workpiece 4 is to be followed by a workpiece 4a of larger diameter (FIG. 3), the pressure in the chambers of the cylinder 18 is reduced and the stop 19 is moved downwardly, as viewed in FIG. 1. The conduit 20 then admits pressurized fluid to the upper cylinder chamber to rotate the gears 14, 14a in a clockwise direction whereby the gear segments 13, 13a and the sections 5a, 5b of the support 5 rotate in a counterclockwise direction to enlarge the area of the passage P. Such counterclockwise rotation of the support 5 causes the pivots 3a–3d to move the housings 1a–1d and the rolls 2a–2d and 2a'–2d' of the units A–D radially outwardly as well as sideways. The stop 19 can be moved along a calibrated scale (not shown) to facilitate selection of various cross-sectional areas of the passage P.

If the workpiece 4a of FIG. 3 is to be followed by a workpiece 4b of much smaller diameter (FIG. 5), the motor including the cylinder 18 is caused to rotate the support 5 in a clockwise direction, as viewed in FIG. 1, to thereby reduce the cross-sectional area of the passage P.

Figure 6:
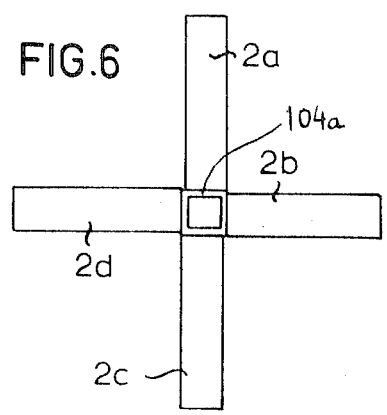
FIG. 6 is a side elevational view of four rolls showing them in positions they assume during transport of an elongated workpiece of relatively large square cross-sectional outline.
Figure 7:
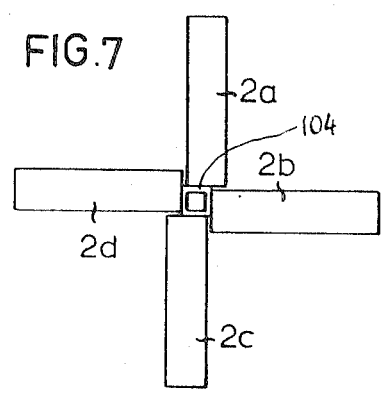
FIG. 7 illustrates the rolls of FIG. 6 but in positions they assume during transport of a smaller workpiece of square cross-sectional outline.
Figure 5:
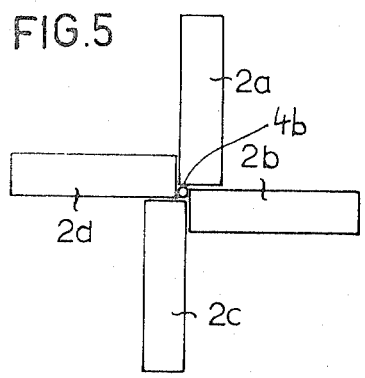
FIG. 5 illustrates the structure of FIG. 3 or 4 but with the rolls in positions they assume during transport of a smallest-diameter workpiece.
Figure 8:
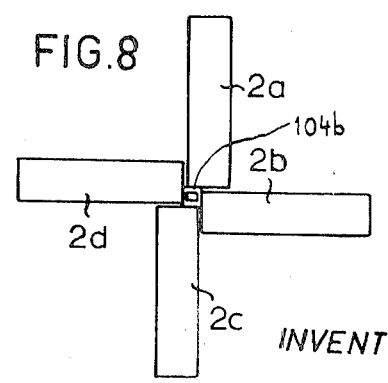
FIG. 8 illustrates the structure of FIG. 6 or 7 but with the rolls in positions they assume during transport of a workpiece of smallest square cross-sectional outline.

The adjustments which are necessary to set the apparatus for transport of workpieces 104a, 104, 104b respectively shown in FIGS. 6, 7 and 8 are analogous. The peripheral surfaces of the rolls 2a–2d and 2a'–2d' are preferably cylindrical so that they can properly engage the external surfaces of tubular or bar stock regardless of whether such stock has a circular or square cross-sectional outline. The stop 19 can be moved up or down by means of an auxiliary motor, not shown, or by hand. Once the adjustment of the support 5 is completed, the conduit 20 admits pressurized fluid to the upper chamber of the cylinder 18 so that the piston rod 17a urges the arm 16 against the support 19 and thus prevents uncontrolled rotation of the support.

It is clear that the apparatus of FIGS. 1 and 2 can move its support 5 between more than three angular positions, i.e., the apparatus can be used for lengthwise transport of more than three sizes of workpieces of circular or square cross-sectional outline.

The apparatus of my invention may be used to feed workpieces into the revolving head of a straightening machine for tubular or bar stock, to draw treated workpieces from such machine, to feed elongated stock into a shaving machine which removes material from external surfaces of workpieces by means of one or more knives installed in a rotary cylindrical head through which the workpieces should pass but should not be free to rotate therewith, as well as in many other types of machines where elongated workpieces must be positively fed to or withdrawn from a processing station.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. Transporting apparatus for elongated workpieces, particularly for lengthwise transport of tubular or bar stock of circular or square cross-sectional outline, comprising a support turnable about a predetermined axis; work-advancing means including a plurality of work-advancing units, each comprising a housing, pivot means connecting said housing to said support, a work-engaging roll having a shaft rotatably journaled in said housing, and drive means for driving said rolls, said rolls defining a passage through which the workpieces are moved lengthwise when said rolls are driven by said drive means; and levelling means coupled with said housings to hold said units against changes in orientation during turning of said support so that such turning effects simultaneous radial and sidewise movement of said rolls to respectively enlarge and reduce the area of said passage in response to turning of said support in first and second directions.

2. Apparatus as defined in claim 1, wherein said work-advancing means includes four units and wherein said pivot means are equidistant from each other and parallel to and equidistant from said axis.

3. Apparatus as defined in claim 2, wherein said levelling means comprises four links each turnable about a fixed axis which is parallel to the axis of said support and each pivoted to one of said housings.

4. Apparatus as defined in claim 3, wherein the axes of said shafts are located in a common plane extending at right angles to said predetermined axis.

5. Apparatus as defined in claim 1, wherein each of said rolls is rotatable about an axis which is normal to and crosses in space said predetermined axis.

6. Apparatus as defined in claim 5, wherein the axes of said pivot means are parallel to said predetermined axis and cross in space the axes of said second portions.

7. Apparatus as defined in claim 1, further comprising rotating means for said support including at least one first gear provided on said support, at least one second gear meshing with said first gear, and means for rotating said second gear in clockwise and counterclockwise directions.

8. Apparatus as defined in claim 7, wherein the means for rotating said second gear comprises a double-acting cylinder.

9. Apparatus as defined in claim 7, further comprising adjustable stop means for limiting the extent of movement of said second gear in one of said directions.

10. Apparatus as defined in claim 1, wherein said drive means comprise transmission means mounted in said housings.